W. WRIGHT.
SPANNER OR WRENCH.
APPLICATION FILED JULY 18, 1913.
1,154,154.
Patented Sept. 21, 1915.
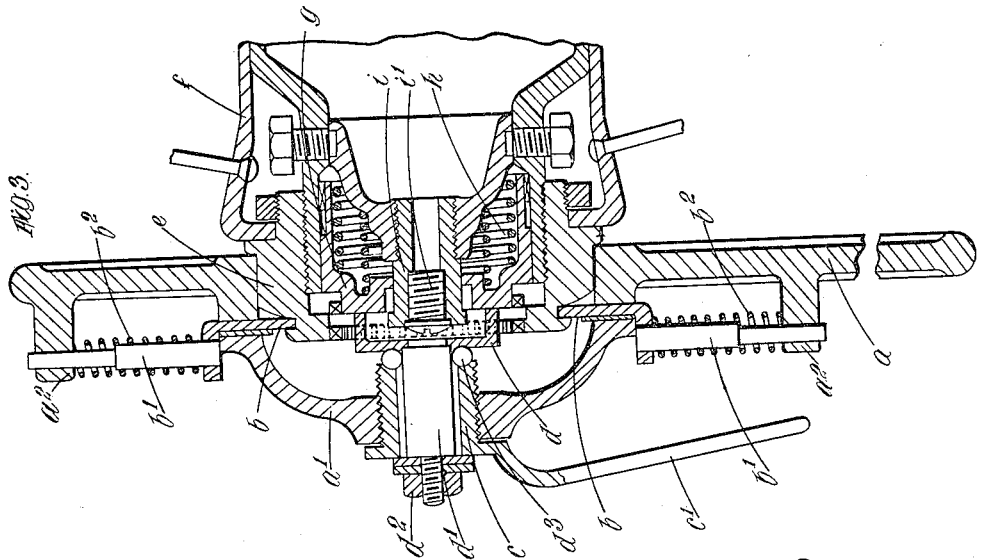
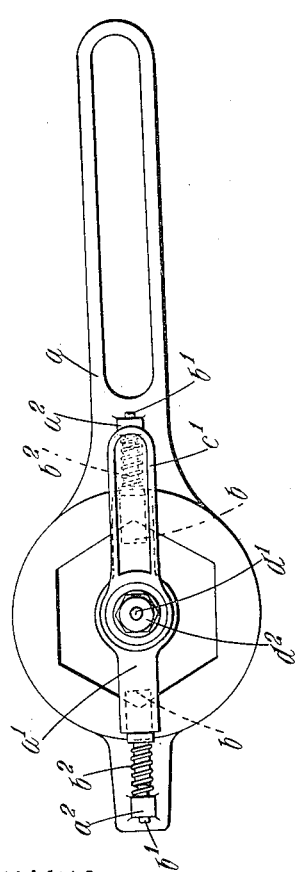
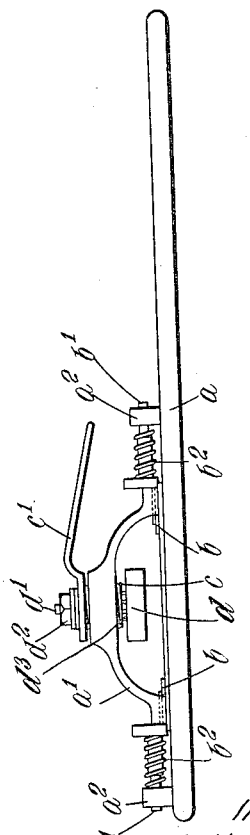
Witnesses:
M. L. Bowen
M. A. Bill
Inventor:
Walter Wright

UNITED STATES PATENT OFFICE.

WALTER WRIGHT, OF STOKE PARK, COVENTRY, ENGLAND, ASSIGNOR TO THE DUNLOP RUBBER COMPANY, LIMITED, OF ASTON CROSS, NEAR BIRMINGHAM, ENGLAND.

SPANNER OR WRENCH.

1,154,154. Specification of Letters Patent. Patented Sept. 21, 1915.

Original application filed October 22, 1911, Serial No. 656,290. Divided and this application filed July 18, 1913. Serial No. 779,681.

*To all whom it may concern:*

Be it known that I, WALTER WRIGHT, a subject of the King of Great Britain, residing at Dechmont, Stoke Park, Coventry, in the county of Warwick, England, have invented certain new and useful Improvements in or Relating to Spanners or Wrenches, of which the following is a specification.

This invention relates to spanners or wrenches and has for its chief object to devise a spanner which is particularly suitable for effecting the locking and unlocking of a detachable vehicle wheel of the kind described in the specification of my concurrent application for patent Serial No. 656290.

According to this invention means are provided for locking the spanner on the nut or rotary member which retains the spoke carrying hub on the inner hub, and a device is also provided which engages with and unlocks the locking member that normally occupies a position in which it prevents rotation of the said nut. The said means for locking the spanner on the nut, may comprise sliding bolts or pins, preferably spring controlled, which engage with or fit into a groove or depression on the nut when the spanner is properly fitted thereon, and the device for engaging with and unlocking the said locking member may comprise a thrusting member preferably rotatable and provided with ball bearings for facilitating the actuation thereof.

In order that the said invention may be clearly understood and readily carried into effect, I will describe the same more fully with reference to the accompanying drawings in which:—

Figures 1 and 2 are respectively a plan and a side elevation of the improved spanner. Fig. 3 is a sectional elevation showing the spanner locked on the retaining nut forming part of the detachable vehicle wheel described in the specification of my aforesaid concurrent application.

$a$ is the spanner which in the example shown is provided with a bridge piece $a'$ having slots for the reception of the sliding bolts or tongues $b\ b$ which are arranged opposite each other. The said bolts are secured to pins $b'$ the ends of which are slidably mounted in projections or lugs $a^2$ of the spanner, and a spring $b^2$ surrounding the pin $b'$ is interposed between the bolt or tongue $b$ and the lug $a^2$. The middle of the bridge portion $a'$ is formed with a screw threaded hole which receives a hollow screw threaded sleeve $c$ provided with a handle or actuating arm $c'$. A spindle $d'$ carrying at its inner end an annular member $d$ is centrally arranged in the sleeve $c$ and is secured in that position by a nut $d^2$ screwed onto a threaded part of the spindle $d'$. The lower end of the sleeve $c$ and the upper face of the annular member $d$ are shaped to form a ball race for the anti-friction balls $d^3$. In the example shown, the annular member $d$ is made cup-shaped so that only the peripheral or rim portion thereof engages with the locking member mounted in the inner hub of the vehicle wheel.

In operation when it is desired to remove the detachable wheel the spanner is placed on the retaining nut $e$ carried by the outer or spoke carrying hub $f$ and the spring controlled bolts $b$ are caused to project into the groove surrounding the nut thus locking the spanner against longitudinal movement on the nut. The actuating handle $c'$ is then angularly displaced to rotate the sleeve which is thus forced toward the toothed locking member $g$ that engages with teeth in the nut $e$. The cup-shaped member is thereby forced into engagement with the locking member $g$ and pushes the same against the compression springs $h$ and retains it in that position. The nut is now free to be rotated by means of the spanner and the detachable wheel is thereby removed.

When replacing the detachable wheel the spanner is again fitted on the nut as aforesaid and the cup shaped member is kept in the extended position to prevent the locking member $g$ from engaging with the nut, and when the latter is screwed on to the inner hub sufficiently, the locking member is allowed to engage with the nut by operating the handle $c'$ in the opposite direction from its previous movement.

The cup-shaped formation of the member $d$ enables it to engage with the locking member without fouling or coming into contact with the stationary stem $i$ which limits the outward movement of the locking member $g$ and enables a centrally arranged grease plug $i'$ to be provided. The member $d$ may of course be otherwise shaped to avoid contact with the stem $i$ when engaging with the locking member.

What I claim and desire to secure by Letters Patent of the United States is:—

1. For use with a detachable vehicle wheel in which a nut for retaining the outer or detachable hub on the inner hub is normally prevented from rotating by a locking member engaging therewith, a tool or spanner comprising in combination means which engage with said nut to enable it to be rotated, spring actuated means which prevent longitudinal movement of the spanner on the nut, and a cup-shaped member axially movable by rotation which disengages said locking member from the nut.

2. For use with a detachable vehicle wheel in which a nut for retaining the outer or detachable hub on the inner hub is normally prevented from rotating by a locking member engaging therewith, a tool or spanner in combination with flat faces which engage with flat faces on the nut, spring actuated locking devices on said spanner which prevent longitudinal movement of the spanner on the nut, and a movable cup-shaped member on said nut to disengage said locking member from the nut.

3. For use with a detachable wheel in which a nut for retaining the outer hub on the inner hub is normally prevented from rotating by a locking member engaging therewith, a spanner comprising in combination means whereby the spanner can be locked on the nut, a rotary sleeve carried by said spanner, a member connected to the sleeve and adapted to disengage said locking member from the nut and antifriction balls interposed between said sleeve and the member connected thereto.

4. For use with a detachable vehicle wheel in which a nut for retaining the outer hub on an inner hub is normally prevented from rotating by a locking member engaging therewith, a spanner comprising in combination, means whereby the spanner can be locked on the nut, a rotary externally screw threaded sleeve, a bridge piece on said spanner, provided with a screw threaded hole to receive said sleeve, a spindle mounted in and connected at one end to said sleeve, a cup shaped member secured to the other end of said spindle and antifriction balls interposed between said sleeves and the cup-shaped member.

5. For use with a detachable vehicle wheel in which the outer hub is retained in position by a nut that is normally prevented from rotating by a locking member engaging therewith, a spanner comprising spring controlled sliding bolts adapted to engage a groove in said nut, a rotary externally screw threaded sleeve, a bridge piece on said spanner provided with a screw threaded hole to receive said sleeve, a spindle mounted in and connected at one end to said sleeve, a cup-shaped member carried at the other end of said spindle and antifriction balls interposed between said sleeve and the cup-shaped member.

6. For use with a detachable wheel in which a nut for retaining the outer hub on the inner hub is normally prevented from rotating by a locking member engaging therewith, a spanner comprising in combination means whereby the spanner can be locked on the nut, a rotary sleeve carried by said spanner, a member having one or more projections adapted to engage with said locking member and antifriction balls interposed between said sleeve and the member connected thereto.

7. For use with a detachable vehicle wheel in which a nut for retaining the outer hub on the inner hub is normally prevented from rotating by a locking member engaging therewith, a spanner comprising in combination flat faces on the said spanner which engage with similar faces on the said nut, spring controlled locking devices, said locking devices being diametrically opposite one another, and a movable member having one or more projections adapted to disengage said locking member from the nut.

In testimony whereof I affix my signature in presence of two witnesses.

WALTER WRIGHT.

Witnesses:
 NORMAN SHARP,
 JOHN WHITELAW.

Copies of this patent may be obtained for five cents each, by addressing the "Commissioner of Patents, Washington, D. C."